(12) United States Patent
Park et al.

(10) Patent No.: US 8,917,669 B2
(45) Date of Patent: *Dec. 23, 2014

(54) METHOD OF DOWNLINK HARQ OPERATION AT AN EXPIRY OF TIME ALIGNMENT TIMER

(71) Applicant: LG Electronics Inc., Seoul (KR)

(72) Inventors: Sung-Jun Park, Gyeonggi-do (KR);
Seung-June Yi, Gyeonggi-do (KR);
Young-Dae Lee, Gyeonggi-do (KR);
Sung-Duck Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,721

(22) Filed: Aug. 6, 2013

(65) Prior Publication Data

US 2013/0315149 A1    Nov. 28, 2013

Related U.S. Application Data

(63) Continuation of application No. 13/545,855, filed on Jul. 10, 2012, now Pat. No. 8,681,704, which is a
(Continued)

(30) Foreign Application Priority Data

Jan. 29, 2009    (KR) .................. 10-2009-0007144

(51) Int. Cl.
*H04W 24/02* (2009.01)
*H04L 1/18* (2006.01)
*H04L 1/00* (2006.01)

(52) U.S. Cl.
CPC ............ *H04W 24/02* (2013.01); *H04L 1/1812* (2013.01); *H04L 1/1838* (2013.01); *H04L 1/1848* (2013.01); *H04L 1/0003* (2013.01)

USPC .......... 370/328; 370/336; 370/349; 714/748; 714/749

(58) Field of Classification Search
CPC ........................................ H04W 24/02
USPC .......... 370/328, 336, 349, 329; 455/748, 749, 455/750
See application file for complete search history.

(56) References Cited

U.S. PATENT DOCUMENTS 6,505,253 B1 * 1/2003 Chiu et al. .................... 709/235
7,124,343 B2 * 10/2006 Moulsley et al. ............. 714/748
(Continued)

FOREIGN PATENT DOCUMENTS

EP    1353481    10/2003
EP    1361706    11/2003
(Continued)

OTHER PUBLICATIONS

Korean Intellectual Property Office Application Serial No. 10-2009-0007144, Notice of Allowance dated Feb. 27, 2014, 2 pages.
(Continued)

*Primary Examiner* — Rasheed Gidado
(74) *Attorney, Agent, or Firm* — Lee, Hong, Degerman, Kang & Waimey

(57) ABSTRACT

According to one embodiment, a method of processing data for a Hybrid Automatic Repeat Request (HARQ) operation in a wireless communication system includes: receiving control signaling from a network; receiving data based on the received control signaling; generating a positive response message (ACK) if the received data is successfully decoded or a negative response message (NACK) if the received data is not successfully decoded, wherein the generated ACK or the generated NACK is not transmitted to the network when a timer is expired or not running; and combining the received data with data currently in a buffer after the timer is stopped or expired.

12 Claims, 3 Drawing Sheets

Related U.S. Application Data continuation of application No. 12/863,972, filed as application No. PCT/KR2009/000496 on Feb. 2, 2009, now Pat. No. 8,243,657.

(60) Provisional application No. 61/025,311, filed on Feb. 1, 2008.

(56) References Cited

U.S. PATENT DOCUMENTS

| | | | |
|---|---|---|---|
| 7,151,944 B2 * | 12/2006 | Hashem et al. | 455/502 |
| 8,665,838 B2 | 3/2014 | Chun et al. | |
| 2003/0100268 A1 | 5/2003 | Moulsley et al. | |
| 2003/0128705 A1 * | 7/2003 | Yi et al. | 370/394 |
| 2003/0210669 A1 | 11/2003 | Vayanos et al. | |
| 2004/0032851 A1 | 2/2004 | Wu | |
| 2004/0037224 A1 | 2/2004 | Choi et al. | |
| 2004/0213199 A1 * | 10/2004 | Cheng | 370/350 |
| 2004/0223507 A1 | 11/2004 | Kuchibhotla et al. | |
| 2006/0056355 A1 * | 3/2006 | Love et al. | 370/332 |
| 2006/0062223 A1 | 3/2006 | Manuel et al. | |
| 2006/0176862 A1 | 8/2006 | Ishimori et al. | |
| 2007/0064599 A1 | 3/2007 | Jiang | |
| 2007/0081513 A1 | 4/2007 | Torsner | |
| 2008/0186946 A1 | 8/2008 | Marinier et al. | |
| 2008/0219291 A1 | 9/2008 | Obuchi et al. | |
| 2009/0103511 A1 | 4/2009 | Marinier et al. | |
| 2009/0175206 A1 | 7/2009 | Wang et al. | |
| 2010/0177747 A1 | 7/2010 | Chun et al. | |
| 2010/0260049 A1 | 10/2010 | Racz et al. | |
| 2010/0278051 A1 | 11/2010 | Larmo et al. | |
| 2013/0242871 A1 | 9/2013 | Marinier et al. | |
| 2013/0279490 A1 | 10/2013 | Pani et al. | |

FOREIGN PATENT DOCUMENTS

| | | |
|---|---|---|
| GB | 2429605 | 2/2008 |
| KR | 1020070109313 | 11/2007 |
| KR | 1020070121585 | 12/2007 |
| WO | 2005034418 | 4/2005 |
| WO | 2005112327 | 11/2005 |

OTHER PUBLICATIONS

Indonesian Patent Office Application No. W-00201000151, Certificate dated Sep. 20, 2013, 30 pages.

U.S. Appl. No. 13/645,302, Notice of Allowance dated Apr. 14, 2014, 6 pages.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.0.0, XP-002521635, Dec. 2007, 24 pages (relevant pp. 13, 14-16).

LG Electronics Inc., "Handling of Nacked Date in HARQ Buffer When UL State is Out of Sync", 3GPP TSG-RAN WG2 #63, R2-084392, Aug. 2008, XP-002523066, 2 pages.

LG Electronics Inc., "UE Specific Sync Timer signalling and procedure", 3GPP TSG-RAN WG2 #60bis, R2-080153, Jan. 2008, XP-50138033, 4 pages.

NTT DOCOMO Inc., "UL SRS resource release at TA Timer expiry", 3GPP TSG RAN WG2 #60bis, R2-080454, Jan. 2008, XP-50138302, 1 page.

European Patent Office Application Serial No. 13003661.9, Search Report dated Oct. 23, 2013, 9 pages.

LG Electronics Inc., "RLC re-segmentation for improved L2 uplink," 3GPP TSG-RAN WG2 #60, R2-075099, Nov. 2007, 2 pages.

Canadian Intellectual Property Office Application Serial No. 2,692,649, Office Action dated Jan. 3, 2013, 2 pages.

The State Intellectual Property Office of the People's Republic of China Application Serial No. 200980110232.X, Certificate of Invention dated Sep. 4, 2013, 16 pages.

NEC, "Resource handling during persistent scheduling," 3GPP TSG-RAN WG2 Meeting #60bis, R2-080151, Jan. 2008, 4 pages.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.0.0, Dec. 2007, 22 pages.

European Patent Office Application Serial No. 09705435.7, Search Report dated May 28, 2014, 8 pages.

National Office of Intellectual Property of Vietnam Application No. 1-2010-02289, Office Action dated Jan. 24, 2014, 2 pages.

U.S. Appl. No. 12/363,387, Final Office Action dated Sep. 12, 2014, 21 pages.

* cited by examiner

Fig. 1 --Prior Art--
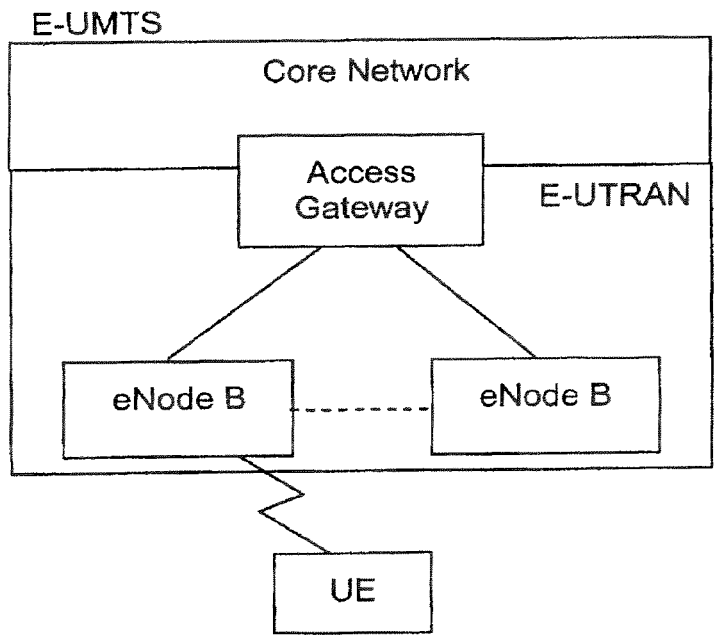
Fig. 2 --Prior Art--
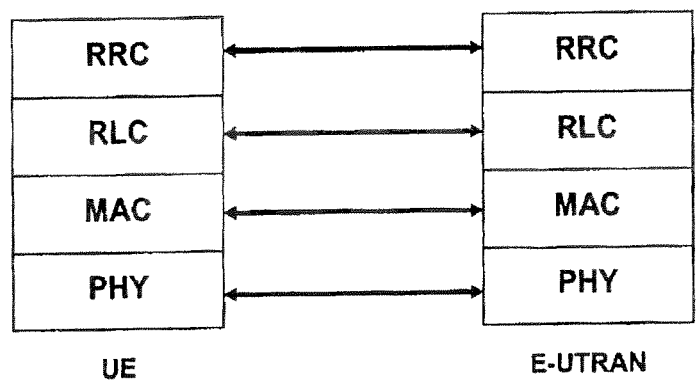
Fig. 3 --Prior Art--
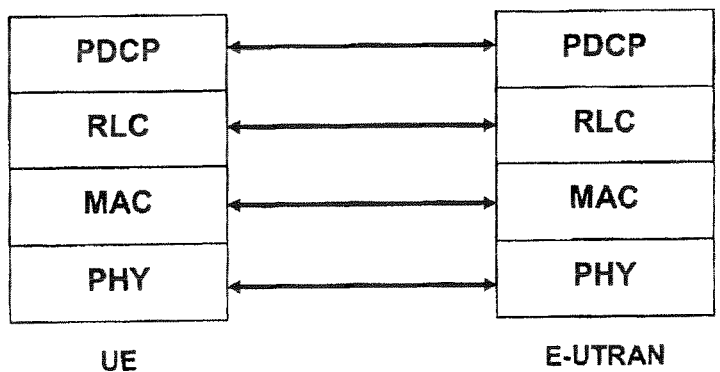

METHOD OF DOWNLINK HARQ OPERATION AT AN EXPIRY OF TIME ALIGNMENT TIMER

CROSS-REFERENCE TO RELATED APPLICATIONS

This application is a continuation of U.S. application Ser. No. 13/545,855, filed on Jul. 10, 2012, now U.S. Pat. No. 8,681,704, which is a continuation of U.S. application Ser. No. 12/863,972, filed on Jul. 21, 2010, now U.S. Pat. No. 8,243,657, which is the National Stage filing under 35 U.S.C. 371 of International Application No. PCT/KR2009/000496, filed on Feb. 2, 2009, which claims the benefit of earlier filing date and right of priority to Korean Application No. 10-2009-0007144, filed on Jan. 29, 2009, and also claims the benefit of U.S. Provisional Application Ser. No. 61/025,311, filed on Feb. 1, 2008, the contents of which are all incorporated by reference herein in their entirety.

TECHNICAL FIELD

The present invention relates to a radio (wireless) communication system providing a radio communication service and a mobile terminal, and more particularly, to a method of downlink HARQ operation of the mobile terminal in an Evolved Universal Mobile Telecommunications System (E-UMTS) or a Long Term Evolution (LTE) system.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

FIG. 2 shows exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a Broadcast Channel (BCH) used for transmitting system information, and a downlink Shared Channel (SCH) used for transmitting user traffic or control messages. A downlink multicast, traffic of broadcast service or control messages may be transmitted via the downlink SCH or via a separate downlink Multicast Channel (MCH). As for channels used in uplink transmission for transmitting data from the mobile terminal to the network, there is a Random Access Channel (RACH) used for transmitting an initial control message, and an uplink Shared Channel (SCH) used for transmitting user traffic or control messages.

As for downlink physical channels for transmitting information transferred via the channels used in downlink transmission over a radio interface between the network and the terminal, there is a Physical Broadcast Channel (PBCH) for transmitting BCH information, a Physical Multicast Channel (PMCH) for transmitting MCH information, a Physical Downlink Shared Channel (PDSCH) for transmitting PCH and a downlink SCH information, and a Physical Downlink Control Channel (PDCCH) (also, referred to as 'DL L1/L2 control channel') for transmitting control information provided by the first and second layers such as a DL/UL Scheduling Grant, and the like. As for uplink physical channels for transmitting information transferred via the channels used in uplink transmission over a radio interface between the network and the terminal, there is a Physical Uplink Shared Channel (PUSCH) for transmitting uplink SCH information, a Physical Random Access Channel (PRACH) for transmitting RACH information, and a Physical Uplink Control Channel (PUCCH) for transmitting control information provided by the first and second layers, such as a HARQ ACK or NACK, a Scheduling Request (SR), a Channel Quality Indicator (CQI) report, and the like.

In LTE system, a HARQ operation is performed in a MAC (Medium Access Control) layer for an effective data transmission. The following is a detailed description of the HARQ operation.

FIG. 4 is an exemplary view showing a HARQ operation method for an effective data transmission. As illustrated in FIG. 4, a base station (or eNB) may transmit downlink scheduling information (referred as 'DL scheduling information' hereafter) through a PDCCH (Physical Downlink Control Channel) in order to provide data to a terminal (UE) during a HARQ operation. The DL scheduling information may include a UE identifier (UE ID), a UE group identifier (Group ID), an allocated radio resource assignment, a duration of the allocated radio resource assignment, a transmission parameter (e.g., Modulation method, payload size, MIMO related information, etc), HARQ process information, a redundancy version, or a new data indicator (NID), etc.

Here, the DL scheduling information may be transmitted through a control channel such as a PDCCH, and the DL scheduling information may be varied with a channel conditions or circumstances. For example, if a current channel condition is better than a channel condition of an initial transmission, higher bit rate may be used by manipulating a modulation scheme or a payload size. In contrast, if a current channel condition is worst than a channel condition of an initial transmission, lower bit rate may be used.

The terminal checks the DL scheduling information by monitoring a PDCCH in every TTI. Then, the terminal receives data through a PUSCH based on the DL scheduling information. Once the terminal receives the data, the received data is stored in a soft buffer, and then the terminal attempts to decode the stored data. If the terminal successfully decodes the data, the terminal transmits an ACK signal to the base station. If the terminal does not successfully decode the data, the terminal transmits a NACK signal to the base station. After that, if the base station receives the ACK signal from the terminal, the base station transmits a next data with an assumption that previous data transmission was successfully performed. If the base station receives the NACK signal, the base station retransmits same data with a same transmission format or a different transmission format. After the NACK signal is transmitted to the base station by the terminal, the terminal transmitted the NACK signal would expect to receive a retransmission of the data. Here, the value in the NDI (New Data Indicator) field contained in the PDCCH may be used for the UE to determine whether the received data is an initial transmission data or a retransmitted data. More specifically, the NDI field is 1 bit field that toggles every time a new data is transmitted or received. (0→1→0→1→ . . . ) As such, the value in the NDI for the retransmitted data always has a same value used in an initial transmission. From this, the UE may know an existence of retransmitted data by comparing these values.

Description of an uplink timing alignment maintenance in a LTE system will be given. In the LTE system that based on an Orthogonal Frequency Division Multiplex (OFDM) technology, there is possibility of interferences between terminals (UEs) during a communication between UE and base station (eNB). In order to minimize interferences between terminals, it is important that the base station must manage or handle a transmission timing of the UE. More particularly, the terminal may exist in random area within a cell, and this implies that a data transmission time (i.e., traveling time of data from UE to base station) can be varied based on a location of the terminal. Namely, if the terminal is camped on edge of the cell, data transmission time of this specific terminal will be much longer than data transmission time of those terminals who camped on a center of the cell. In contrast, if the terminal is camped on the center of the cell, data transmission time of this specific terminal will be much shorter than data transmission time of those terminals who camped on the edge of the cell. The base station (eNB) must manage or handle all data or signals, which are transmitted by the terminals within the cell, in order to prevent the interferences between the terminals. Namely, the base station must adjust or manage a transmission timing of the terminals upon each terminal's condition, and such adjustment can be called as the timing alignment maintenance. One of the methods for maintaining the timing alignment is a random access procedure. Namely, during the random access procedure, the base station receives a random access preamble transmitted from the terminal, and the base station can calculate a time alignment (Sync) value using the received random access preamble, where the time alignment value is to adjust (i.e., faster or slower) a data transmission timing of the terminal. The calculated time alignment value can be notified to the terminal by a random access response, and the terminal can update the data transmission timing based on the calculated time alignment value. In other method, the base station may receive a sounding reference symbol (SRS) transmitted from the terminal periodically or randomly, the base station may calculate the time alignment (Sync) value based on the SRS, and the terminal may update the data transmission timing according to the calculated time alignment value.

As explained above, the base station (eNB) may measure a transmission timing of the terminal though a random access preamble or SRS, and may notify an adjustable timing value to the terminal. Here, the time alignment (Sync) value (i.e., the adjustable timing value) can be called as a time advance command (referred as 'TAC' hereafter). The TAC may be process in a MAC (Medium Access control) layer. Since the terminal does not camps on a fixed location, the transmission timing is frequently changed based on a terminal's moving location and/or a terminal's moving velocity. Concerning with this, if the terminal receives the time advance command (TAC) from the base station, the terminal expect that the time advance command is only valid for certain time duration. A time alignment timer (TAT) is used for indicating or representing the certain time duration. As such, the time alignment timer (TAT) is started when the terminal receives the TAC (time advance command) from the base station. The TAT value is transmitted to the terminal (UE) through a RRC (Radio Resource Control) signal such as system information (SI) or a radio bearer reconfiguration. Also, if the terminal receives a new TAC from the base station during an operation of the TAT, the TAT is restarted. Further, the terminal does not transmit any other uplink data or control signal (e.g., data on physical uplink shared channel (PUSCH), control signal on Physical uplink control channel (PUCCH)) except for the random access preamble when the TAT is expired or not running.

In general, a MAC layer of the terminal and base station handles a time alignment (synchronize) management. Namely, The TAC is generated in the MAC layer of the base station, and the MAC layer of the terminal receives the TAC through a MAC message from the base station. However, because the TAC is received by the MAC message, a transmission of the TAC is not fully guaranteed. For example, the base station transmits the MAC message including the TAC in a HARQ process, and the terminal attempts to receive the data. The terminal transmits a NACK signal to the base station if the terminal fails to decode the data. However, if such NACK signal is mistakenly treated as an ACK signal by the base station, a TAT of the base station is restarted whereas a TAT of the terminal is not restarted. Thusly, a failed synchronization can be happened between the terminal and base station. In this case, if there is data to be transmitted to the terminal from the base station, the base station transmits a PDCCH and a PUSCH to the terminal. Usually, the PDCCH includes a control signal for a data transmission and the PUSCH includes an actual data. However, the uplink transmission is prohibited because the terminal is not time-aligned with the base station, thereby transmitting an ACK or NACK signal to the base station. However, this causes a great drawback of wasting unnecessary radio resource(s).

DISCLOSURE OF INVENTION

Technical Solution

Therefore, an object of the present invention is to provide a method of processing data for a HARQ (Hybrid Automatic Repeat reQuest) in a wireless communication system, and more particularly, for an optimized downlink HARQ operation when time alignment timer is not running or at an expiry of time alignment timer.

To achieve this and other advantages and in accordance with the purpose of the present invention, as embodied and broadly described herein, there is provided a method of processing data for a HARQ (Hybrid Automatic Repeat Request) operation in a wireless communication system, the method comprising: receiving a control signaling from a network; receiving a data based on the received control signaling; decoding the received data; and generating a positive response message (ACK) if the received data is successfully decoded or a negative response message (NACK) if the received data is not successfully decoded, wherein the generated positive or negative response message is not transmitted to the network when a timer is expired or not running.

Also, To achieve this and other advantages and in accordance with the purpose of the present invention, as embodied and broadly described herein, there is also provided a method of processing data for a HARQ (Hybrid Automatic Repeat Request) operation in a wireless communication system, the method comprising: receiving a control signaling from a network; receiving a data based on the received control signaling; and discarding the received data when a timer is expired or not running.

BRIEF DESCRIPTION OF DRAWINGS

FIG. 1 shows an exemplary network structure of an Evolved Universal Mobile Telecommunications System (E-UMTS) as a mobile communication system to which a related art and the present invention are applied;

FIG. 2 shows an exemplary view of related art control plane architecture of a radio interface protocol between a terminal and an E-UTRAN;

FIG. 3 shows an exemplary view of related art user plane architecture of a radio interface protocol between a terminal and an E-UTRAN;

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, a terminal (or UE) may perform a random access procedure in the following cases: 1) when the terminal performs an initial access because there is no RRC Connection with a base station (or eNB), 2) when the terminal initially accesses to a target cell in a handover procedure, 3) when it is requested by a command of a base station, 4) when there is uplink data transmission in a situation where uplink time synchronization is not aligned or where a specific radio resource used for requesting radio resources is not allocated, and 5) when a recovery procedure is performed in case of a radio link failure or a handover failure.

In the LTE system, the base station allocates a dedicated random access preamble to a specific terminal, and the terminal performs a non-contention random access procedure which performs a random access procedure with the random access preamble. In other words, there are two procedures in selecting the random access preamble: one is a contention based random access procedure in which the terminal randomly selects one within a specific group for use, another is a non-contention based random access procedure in which the terminal uses a random access preamble allocated only to a specific terminal by the base station. The difference between the two random access procedures is that whether or not a collision problem due to contention occurs, as described later. And, the non-contention based random access procedure may be used, as described above, only in the handover procedure or when it is requested by the command of the base station.

Figure 4:
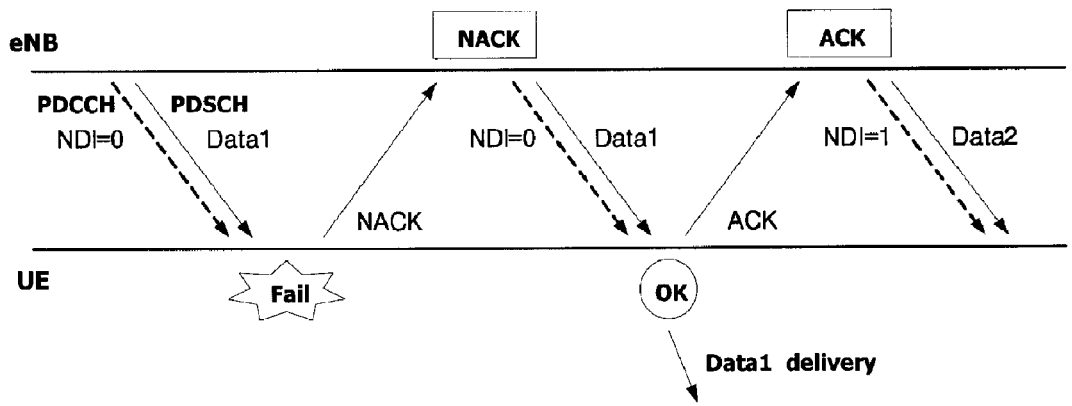
FIG. 4 is an exemplary view showing a HARQ operation method for an effective data transmission.
Figure 5:
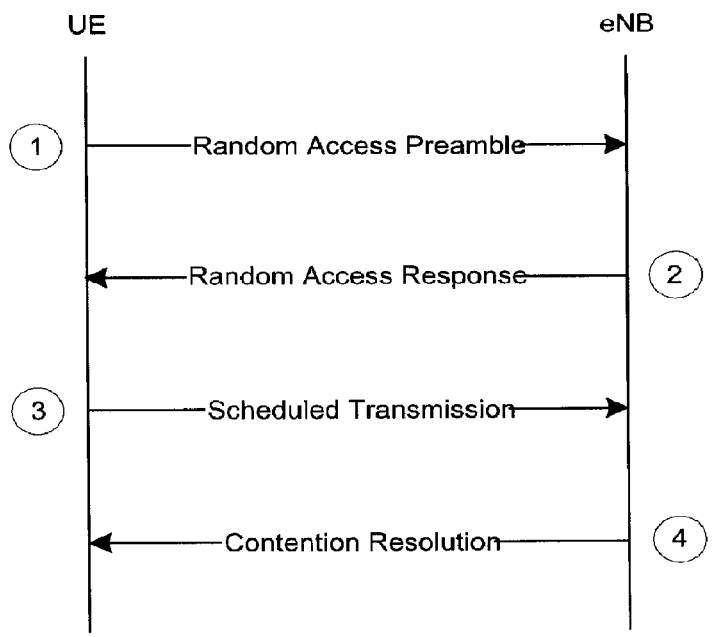
FIG. 5 shows an exemplary view of a contention based random access procedure.

Based on the above description, FIG. 5 shows an operation procedure between a terminal and a base station in a contention based random access procedure.

First, a terminal in the contention based random access randomly may select a random access preamble within a group of random access preambles indicated through system information or a handover command, may select PRACH resources capable of transmitting the random access preamble, and then may transmit the selected random access preamble to a base station (Step 1).

After transmitting the random access preamble, the terminal may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the terminal appropriately receives information transferred on the PDSCH. That is, the PDCCH may include information about a terminal that should receive the PDSCH, frequency and time information of radio resources of the PDSCH, a transfer format of the PDSCH, and the like. Here, if the PDCCH has been successfully received, the terminal may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify terminals to which information such as the UL Grant, the temporary C-RNTI, and the Time Alignment Command would be valid (available, effective) because one random access response may include random access response information for one or more terminals. Here, the random access preamble identifier may be identical to the random access preamble selected by the terminal in Step 1.

If the terminal has received the random access response valid to the terminal itself, the terminal may process each of the information included in the random access response. That is, the terminal applies the Time Alignment Command, and stores the temporary C-RNTI. In addition, the terminal uses the UL Grant so as to transmit data stored in a buffer of the terminal or newly generated data to the base station (Step 3). Here, a terminal identifier should be essentially included in the data which is included in the UL Grant (message 3). This is because, in the contention based random access procedure, the base station may not determine which terminals are performing the random access procedure, but later the terminals should be identified for contention resolution. Here, two different schemes may be provided to include the terminal identifier. A first scheme is to transmit the terminal's cell identifier through the UL Grant if the terminal has already received a valid cell identifier allocated in a corresponding cell prior to the random access procedure. Conversely, the second scheme is to transmit the terminal's unique identifier (e.g., S-TMST or random TD) if the terminal has not received a valid cell identifier prior to the random access procedure. In general, the unique identifier is longer than the cell identifier. In Step 3, if the terminal has transmitted data through the UL Grant, the terminal starts the contention resolution timer.

After transmitting the data with its identifier through the UL Grant included in the random access response, the terminal waits for an indication (instruction) of the base station for the contention resolution. That is, the terminal attempts to receive the PDCCH so as to receive a specific message (Step 4). Here, there are two schemes to receive the PDCCH. As described above, if the terminal identifier transmitted via the UL Grant is the cell identifier, the terminal attempts to receive the PDCCH by using its own cell identifier. If the terminal identifier transmitted via the UL Grant is its unique identifier, the terminal attempts to receive the PDCCH by using the temporary C-RNTI included in the random access response. Thereafter, for the former, if the PDCCH (message 4) is received through its cell identifier before the contention resolution timer is expired, the terminal determines that the random access procedure has been successfully (normally) performed, thus to complete the random access procedure. For the latter, if the PDCCH is received through the temporary cell identifier before the contention resolution timer is expired, the terminal checks data (message 4) transferred by the PDSCH that the PDCCH indicates. If the unique identifier of the terminal is included in the data, the terminal determines that the random access procedure has been successfully (normally) performed, thus to complete the random access procedure.

Figure 6:
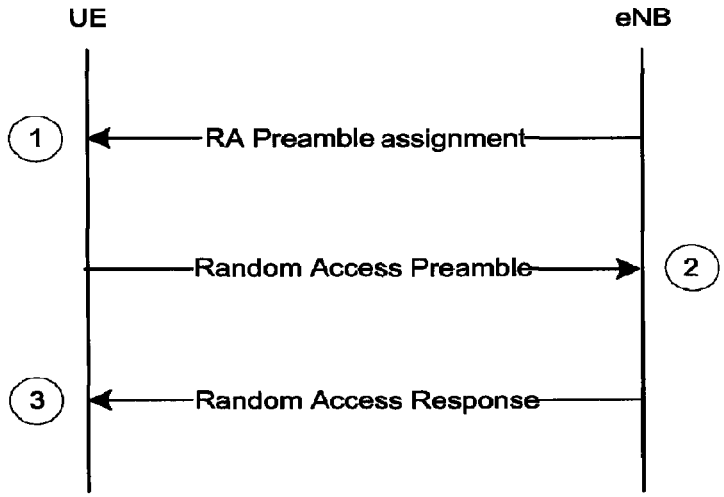
FIG. 6 shows an exemplary view of a non-contention based random access procedure.

FIG. 6 shows an operation procedure between a terminal and a base station in a non-contention based random access procedure. As compared with the contention based random access procedure, the random access procedure is determined to be successfully performed by receiving the random access response information in the non-contention based random access procedure, thus to complete the random access process.

In general, the non-contention based random access procedure may be performed in the following two cases: one is the handover procedure, and the other is a request by the command of the base station. To be certain, the contention based random access procedure may also be performed in those two cases. First, for the non-contention based random access procedure, it is important to receive, from the base station, a dedicated random access preamble without having any possibility of contention. Here, a handover command and a PDCCH command may be used to assign the random access preamble. Then, after the random access preamble dedicated to only the terminal itself has been assigned from the base station, the terminal transmits the preamble to the base station. Thereafter, the method for receiving the random access response information is the same as that in the above-described contention based random access procedure.

Figure 7:
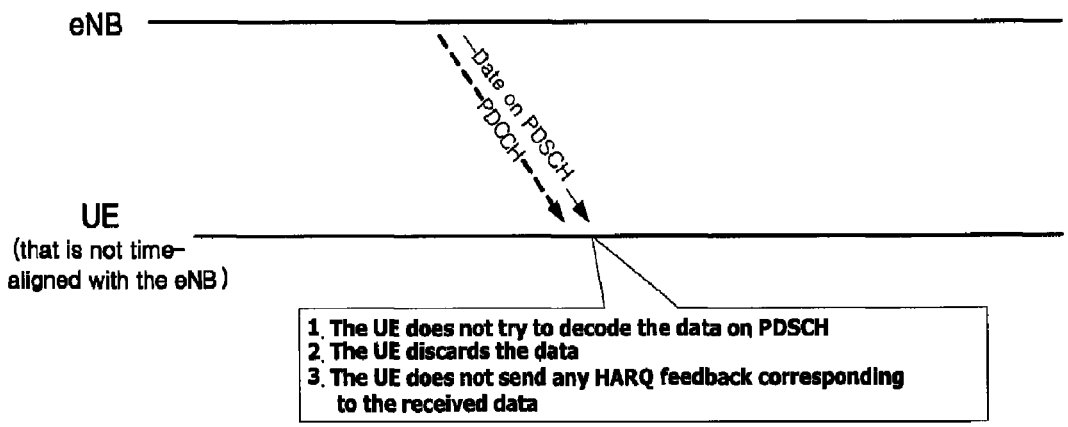
FIG. 7 shows a first exemplary embodiment of downlink HARQ operation of mobile terminal according to the present invention.

According to a first embodiment of the present invention, if the terminal is not time-aligned with the base station and the terminal receives data in HARQ process, the present invention proposes to discard the received data and not to send any HARQ feedback. Namely, as illustrated in FIG. 7, when the terminal (that is not time-aligned with the base station) receives a PDCCH (Physical Downlink Control Channel) including its own C-RNTI (Cell-Radio Network Temporary Identifier) or SPS (Semi-Persistent Scheduling), the terminal may check whether the received PDCCH includes PDSCH radio resource information that the terminal has to be received. If such PDCCH is received by the terminal, the present invention may propose not to attempt to receive the PDSCH radio resource information or not to decode the received data on the PDSCH. Further, the terminal may discard the received data on the PDSCH, and may not send any HARQ feedback (i.e., ACK signal or NACK signal) corresponding to the received data.

Figure 8:
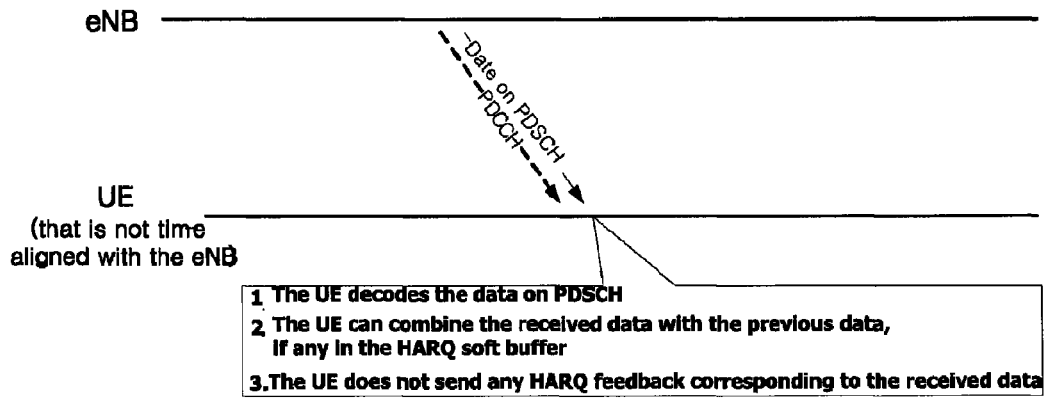
FIG. 8 shows a second exemplary embodiment of downlink HARQ operation of mobile terminal according to the present invention.

According to a second embodiment of the present invention, if the terminal is not time-aligned with the base station and the terminal receives data in HARQ process, the present invention proposes to decode the received data but not to send any HARQ feedback. Namely, as illustrated in FIG. 8, when the terminal (that is not time-aligned with the base station) receives a PDCCH (Physical Downlink Control Channel)

including its own C-RNTI (Cell-Radio Network Temporary Identifier) or SPS (Semi-Persistent Scheduling), the terminal may check whether the received PDCCH includes PDSCH radio resource information that the terminal has to be received. If such PDCCH is received by the terminal, the present invention may propose to attempt to receive the PDSCH radio resource information and to decode the received data on the PDSCH. Based on a result of the decoding, the terminal may determine whether to send an ACK signal or to send a NACK signal. In present invention, although such determination may be made by the terminal, such ACK or NACK signal should not be transmitted to the base station. Further, if the received data is successfully decoded and a TAC (Timing Advance Command) is included in the received data, the terminal may apply the TAC and may start a TAT (Time Alignment Timer).

Further, the terminal may discard the received data on the PDSCH, and may not send any HARQ feedback (i.e., ACK signal or NACK signal) corresponding to the received data. Also, if the received data is successfully decoded and the TAC is included in the received data, the terminal may apply the TAC and may start the TAT. In this case, the present invention proposes not to transmit an ACK from the terminal to the base station. In general, after receiving the data in downlink, the terminal may know radio resource(s) (i.e. frequency, time, code, etc) of HARQ feedback associated with the reception of the data. More in detail, the terminal may extract the radio resource(s) of the HARQ feedback by receiving a control signal (i.e. PDCCH). Accordingly, the terminal may decode the received data, may determine a kind of HARQ feedback (e.g. ACK or NACK) based on a result of the decoding, and may transmit the HARQ feedback to the base station. However, the terminal may not be able to transmit the HARQ feedback to the base station within a transmission timing because a processing time to perform all above mentioned steps may take too long. Further, there is possibility that some of received TAC other that a random access channel procedure may be discarded.

The present invention proposes methods of handling a HARQ soft buffer of the terminal when the terminal is not time-aligned with the base station and the terminal receives a PDCCH including its own a C-RNTI or SPS (Semi-Persistent Scheduling) C-RNTI. Here, the PDCCH includes PDSCH radio resource information that the terminal has to be received.

In a first method, the present invention proposes the terminal to flush data or contents of all soft buffers (i.e., HARQ soft buffers) after a completion of the data decoding. Namely, if the terminal (i.e. not time-aligned terminal with the base station) receives data in a HARQ process, the received data is stored in a soft buffer. Then the stored data in the soft buffer is decoded. If the data decoding is successfully performed, the received data may be further processed and may be delivered to an upper layer. However, even if the data decoding is successfully performed, a HARQ feedback (i.e. ACK) is not transmitted to the base station. Here, as the data decoding is completed, the terminal may flush the stored data in all HARQ soft buffers. If the data decoding is not successfully performed, a HARQ feedback (i.e. NACK) is also not transmitted to the base station, and the terminal may also flush the stored data in all HARQ soft buffers.

In a second method, the present invention proposes the terminal to flush all data or contents of soft buffers after a completion of the data decoding and the data decoding is successfully performed. Namely, if the terminal (i.e. not time-aligned terminal with the base station) receives data in a HARQ process, the received data is stored in a soft buffer. Then the stored data in the soft buffer is decoded. If the data is not successfully decoded, the terminal may keep the received data in the soft buffer. Then, the terminal may wait to receive a retransmission of the data from the base station. Once the terminal receives the retransmitted data, the terminal may try to combine the retransmitted data with a currently existed data in the soft buffer. After combining, the terminal may try to decode the combined data again. If the combined data still can not be decoded, the terminal would wait to receive another data retransmission. In contrast, if the data decoding for the combined data is successfully performed, the terminal may flush the data in the soft buffer at this time.

In a third method, the terminal may replace currently existed data or content in the soft buffer with a new data only when the new data is transmitted from the base station. Here, the terminal may not flush the data in the soft buffer. Namely, the currently existed data is replaced with the new data only when a NDT of the terminal is toggled. In this case, the data in the soft buffer is not flushed even if the TAT is expired or is not running.

In a forth method, the present invention proposes the terminal to flush data in the soft buffer all the time. Namely, if the terminal receives any data in the HARQ process, such data is stored in the soft buffer. However, the data in the soft buffer is flushed immediately.

The present disclosure may provide a method of processing data for a HARQ (Hybrid Automatic Repeat Request) operation in a wireless communication system, the method comprising: receiving a control signaling from a network; receiving a data based on the received control signaling; decoding the received data; generating a positive response message (ACK) if the received data is successfully decoded or a negative response message (NACK) if the received data is not successfully decoded; replacing data currently in a soft buffer with the received data after the data is received; flushing the received data in the soft buffer when the positive response message is generated or when the timer is expired or not running; flushing the received data in the soft buffer after the received data is decoded, wherein the generated positive or negative response message is not transmitted to the network when a timer is expired or not running, the timer is a Time Alignment timer (TAT), the control signaling is a downlink assignment, the downlink assignment includes at least one of downlink scheduling information, a C-RNTI (Cell-Radio Network Temporary Identifier), and a Semi-persistent Scheduling C-RNTI, the data is a transport block (TB), and the received data is kept in the soft buffer even when the timer is expired or not running.

It can be said that the present invention may also provide a method of processing data for a HARQ (Hybrid Automatic Repeat Request) operation in a wireless communication system, the method comprising: receiving a control signaling from a network; receiving a data based on the received control signaling; and discarding the received data when a timer is expired or not running, wherein the timer is a Time Alignment timer (TAT), the control signaling is a downlink assignment, the downlink assignment includes at least one of downlink scheduling information, a C-RNTI (Cell-Radio Network Temporary Identifier), and a Semi-persistent Scheduling C-RNTI, and the data is a transport block (TB).

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed:

1. A method of performing a HARQ (Hybrid Automatic Repeat reQuest) operation in a wireless communication system, the method comprising:
   starting a Time Alignment Timer (TAT) when a Timing Advance Command (TAC) is received,
   wherein the TAC is time alignment information for an uplink time alignment;
   attempting to decode received data in a buffer;
   generating a positive acknowledgement (ACK) if the received data in the buffer is successfully decoded or a negative acknowledgement (NACK) if the received data in the buffer is not successfully decoded;
   wherein the generated positive acknowledgment (ACK) or negative acknowledgment (NACK) is not provided to a physical layer for transmitting to a network if the Time Alignment Timer (TAT) is expired.

2. The method of claim 1, further comprising:
   replacing data currently in the buffer with the received data if a new transmission is indicated for the HARQ operation.

3. The method of claim 1, further comprising:
   combining the received data with data currently in the buffer if a retransmission is indicated for the HARQ operation.

4. The method of claim 1, further comprising:
   delivering the decoded data to a disassembly and demultiplexing entity if it is a successful decoding of the received data in the buffer.

5. The method of claim 1, wherein the buffer is a soft buffer, and the received data is received from the network according to a control signaling.

6. The method of claim 2, wherein the control signaling includes at least one of downlink scheduling information, a C-RNTI (Cell-Radio Network Temporary Identifier), and a Semi-persistent Scheduling C-RNTI.

7. A User Equipment (UE) performing a HARQ (Hybrid Automatic Repeat reQuest) operation in a wireless communication system, the UE comprising:
   a controller is configured to:
   start a Time Alignment Timer (TAT) when a Timing Advance Command (TAC) is received,
   wherein the TAC is time alignment information for an uplink time alignment;
   attempt to decode received data in a buffer;
   generate a positive acknowledgement (ACK) if the received data in the buffer is successfully decoded or a negative acknowledgement (NACK) if the received data in the buffer is not successfully decoded;
   wherein the generated positive acknowledgment (ACK) or negative acknowledgment (NACK) is not provided to a physical layer for transmitting to a network if the Time Alignment Timer (TAT) is expired.

8. The User Equipment (UE) of claim 7, wherein the controller is further configured to:
   replace data currently in the buffer with the received data if a new transmission is indicated for the HARQ operation.

9. The User Equipment (UE) of claim 7, wherein the controller is further configured to:
   combine the received data with data currently in the buffer if a retransmission is indicated for the HARQ operation.

10. The User Equipment (UE) of claim 7, wherein the controller is further configured to:
    deliver the decoded data to a disassembly and demultiplexing entity if it is a successful decoding of the received data in the buffer.

11. The User Equipment (UE) of claim 7, wherein the buffer is a soft buffer, and the received data is received from the network according to a control signaling.

12. The User Equipment (UE) of claim 11, wherein the control signaling includes at least one of downlink scheduling information, a C-RNTI (Cell-Radio Network Temporary Identifier), and a Semi-persistent Scheduling C-RNTI.

* * * * *